United States Patent
Wang (10) Patent No.: US 10,459,562 B2
(45) Date of Patent: Oct. 29, 2019

(54) ARRAY SUBSTRATE, DISPLAY PANEL, AND ELECTRONIC DEVICE

(71) Applicants: Shanghai Tianma Micro-Electronics Co., Ltd., Shanghai (CN); Tianma Micro-Electronics Co., Ltd., Shenzhen (CN)

(72) Inventor: Chao Wang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 181 days.

(21) Appl. No.: 14/866,452

(22) Filed: Sep. 25, 2015

(65) Prior Publication Data
US 2016/0291769 A1    Oct. 6, 2016

(30) Foreign Application Priority Data
Apr. 1, 2015 (CN) .......................... 2015 1 0153143

(51) Int. Cl.
    G06F 3/041    (2006.01)
    G06F 3/044    (2006.01)
(52) U.S. Cl.
    CPC ............ *G06F 3/0416* (2013.01); *G06F 3/044* (2013.01); *G06F 3/0412* (2013.01); *G06F 2203/04107* (2013.01)
(58) Field of Classification Search
    None
    See application file for complete search history.

(56) References Cited

U.S. PATENT DOCUMENTS

| 7,423,621 | B2 * | 9/2008 | Lin | ..................... G02F 1/13452 345/87 |
| 9,606,679 | B2 * | 3/2017 | Ciou | ....................... G06F 3/044 |

(Continued)

FOREIGN PATENT DOCUMENTS

| CN | 101598875 A | 12/2009 |
| CN | 201788340 U | 4/2011 |

(Continued)

OTHER PUBLICATIONS

Chinese Application No. 201510153143.0, First Office Action dated Apr. 19, 2017.

*Primary Examiner* — Lunyi Lao
*Assistant Examiner* — Benjamin X Casarez
(74) *Attorney, Agent, or Firm* — Alston & Bird LLP (57) ABSTRACT

An array substrate, a display panel, and an electronic device are provided. The array assembly includes: a substrate defining a display region and a peripheral region; gate lines and data lines which are set in the display region; touch control electrodes which are set in the display region and electrically isolated; and a first metal layer set on the substrate, which includes: touch control lines set in the display region, wherein each of the touch control lines is electrically connected with corresponding touch control electrode, and adapted to provide a first signal for the corresponding touch control electrode; and a first BUS line set in the peripheral region, where the first BUS line is adapted to provide a second signal for at least one of the touch control lines, the gate lines, and the data lines Accordingly, BUS lines are arranged on different metal layers, thus narrow frame is achieved.

8 Claims, 8 Drawing Sheets

(56) References Cited

U.S. PATENT DOCUMENTS

| | | | |
|---|---|---|---|
| 2009/0296038 A1 | 12/2009 | Yoon et al. | |
| 2010/0039600 A1* | 2/2010 | Ishige | G02F 1/1345 349/139 |
| 2010/0194697 A1* | 8/2010 | Hotelling | G06F 3/0412 345/173 |
| 2011/0175841 A1* | 7/2011 | Nakamura | G06F 1/1626 345/173 |
| 2012/0092273 A1* | 4/2012 | Lyon | G06F 3/0412 345/173 |
| 2012/0327057 A1* | 12/2012 | Sakamoto | G11C 19/184 345/211 |
| 2013/0081869 A1* | 4/2013 | Kim | G06F 3/044 174/261 |
| 2013/0147724 A1 | 6/2013 | Hwang et al. | |
| 2014/0042410 A1* | 2/2014 | Chen | H01L 51/5203 257/40 |
| 2014/0176492 A1* | 6/2014 | An | G06F 3/044 345/174 |
| 2014/0313160 A1* | 10/2014 | Ciou | G06F 3/044 345/174 |
| 2014/0362031 A1* | 12/2014 | Mo | G09G 3/36 345/174 |
| 2015/0049045 A1* | 2/2015 | Yousefpor | G06F 3/0412 345/174 |
| 2015/0194443 A1* | 7/2015 | Chen | H01L 27/1248 257/72 |
| 2015/0270291 A1* | 9/2015 | Tian | H01L 23/3171 257/72 |
| 2015/0271930 A1* | 9/2015 | Cok | G06F 3/044 156/60 |
| 2016/0041644 A1* | 2/2016 | Bae | G06F 3/044 345/174 |
| 2016/0054836 A1* | 2/2016 | Wu | G06F 3/044 345/173 |
| 2016/0070395 A1* | 3/2016 | Hung | G09G 5/003 345/173 |
| 2016/0091997 A1* | 3/2016 | Ho | G06F 3/044 345/173 |
| 2016/0147325 A1* | 5/2016 | Tai | G06F 3/041 345/173 |
| 2016/0170525 A1* | 6/2016 | Zhai | G06F 3/044 345/174 |
| 2016/0246408 A1 | 8/2016 | Wang et al. | |
| 2016/0293631 A1* | 10/2016 | Sun | G06F 3/041 |
| 2016/0300863 A1* | 10/2016 | Koide | H01L 27/1244 |
| 2017/0090644 A1* | 3/2017 | Yao | G06F 3/0416 |
| 2017/0185181 A1* | 6/2017 | Kim | G06F 3/0412 |
| 2017/0192580 A1* | 7/2017 | Jung | G06F 3/0416 |
| 2017/0277326 A1* | 9/2017 | Cao | G06F 3/0412 |
| 2018/0239476 A1* | 8/2018 | Yoshida | G02F 1/1345 |

FOREIGN PATENT DOCUMENTS

| | | | | |
|---|---|---|---|---|
| CN | 104020891 A | | 9/2014 | |
| CN | 104699349 A | * | 6/2015 | G06F 3/041 |

* cited by examiner

FIG. 11

ARRAY SUBSTRATE, DISPLAY PANEL, AND ELECTRONIC DEVICE

CROSS-REFERENCE TO RELATED APPLICATIONS

The present application claims priority to Chinese patent application No. 201510153143.0, filed on Apr. 1, 2015, and entitled "ARRAY SUBSTRATE, DISPLAY PANEL, AND ELECTRONIC DEVICE", the entire disclosure of which is incorporated herein by reference.

BACKGROUND

Figure 1:
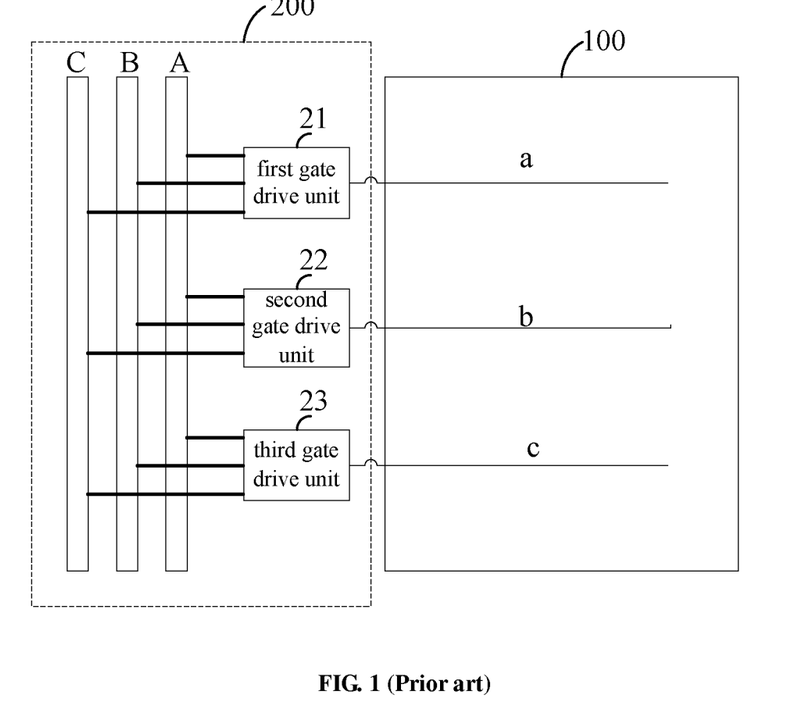
FIG. 1 schematically illustrates an existing array substrate.

Referring to FIG. 1, an existing TFT-LCD (Thin Film Transistor Liquid Crystal Display) touch screen is illustrated. The TFT-LCD touch screen includes a display region 100 and a peripheral region 200, the display region is used for displaying images, and the peripheral region 200 is used for setting BUS lines (e.g. BUS lines A, B and C as shown in FIG. 1). These BUS lines are adapted to provide signals for the touch control lines, gate lines and/or data lines in the display region.

Currently, touch screens in high resolution are on the demand. The resolution of the touch screen is improved by increasing the number of the BUS lines, such as the 8 phase, 12/16 phase products. It can be understood that, the more the BUS lines, the more areas are occupied by the BUS lines. In other words, the BUS lines occupy more area of the peripheral region, and may even occupy half area of the peripheral region. It can be concluded that, in the existing touch screens, it is hard to achieve high resolution and narrow frame at the same time.

Accordingly, an array substrate, which is adapted to achieve both high resolution and narrow frame of a screen, is required.

BRIEF DESCRIPTION OF THE DRAWINGS

FIG. 3b schematically illustrates a sectional view along W1-W2 in FIG. 3a;

FIG. 7b schematically illustrates a sectional view along H1-H2 in FIG. 7a;

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Referring to FIG. 1, an existing array substrate is illustrated. As shown, the TFT-LCD touch screen includes a display region 100 and a peripheral region 200, the display region is used for displaying images, and the peripheral region 200 is used for setting BUS lines (e.g. the BUS lines A, B and C as shown in FIG. 1).

These BUS lines are set for providing signals to touch control lines, gate lines and/or data lines in the display region 100. Herein, we will take the BUS lines are set for providing signals to gate drive units as an exemplary illustration.

As shown in FIG. 1, the BUS line A, the BUS line B, and the BUS line C are connected with gate drive units of different drive gates, respectively. In this embodiment, there are three gate drive units, which are respectively a first gate drive unit 21, a second gate drive unit 22, and a third gate drive unit 23. The gate drive units are generally embodied as shift registers, such as ASG (Amorphous Silicon Gate) drives commonly used currently. Output terminals of the three gate drive units are connected with three gate lines (gate lines a, b, and c as shown in FIG. 1), respectively.

It should be noted that, in FIG. 1, the vertical lines A, B, and C are BUS lines, and the horizontal lines a, b, and c are connect lines which are just used for electrically connecting two components.

Figure 2:
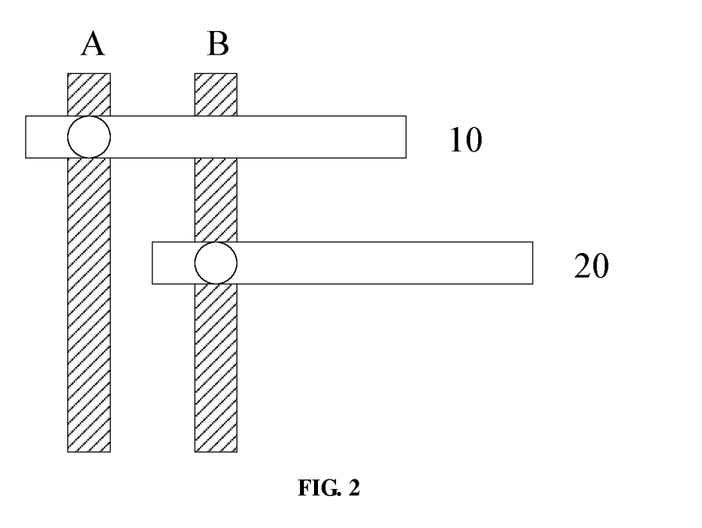
FIG. 2 schematically illustrates existing BUS lines and connect lines.

Furthermore, in existing array substrates, all the BUS lines in the peripheral region are set on a common metal layer. In other words, all the BUS lines are formed by one single metal layer. In practice, the metal layer, where the gate lines are located, is generally used for forming the BUS lines. As shown in FIG. 2, the BUS lines and the connect lines are illustrated.

In FIG. 2, there are two BUS lines for exemplary illustration. Specifically, BUS lines A and B are electrically connected with connect lines 10 and 20, respectively. In existing technology, the BUS lines A and B are located on a common metal layer, and the connect lines a and b are located on another common metal layer. The BUS lines and the connect lines are electrically connected through via holes as indicated by circles in FIG. 2.

In one metal layer, as there are a large number of BUS lines in the peripheral region, an area occupied by the BUS lines is large. Thus, it is hard to make the peripheral region where the BUS lines located narrow. In order to solve this problem, technical solution provided by the present disclosure is as following.

The array substrate provided by the present disclosure includes: a substrate defining a display region and a peripheral region; a plurality of gate lines and a plurality of data lines, which are both set in the display region; a plurality of touch control electrodes, which are set in the display region and electrically isolated from each other; and a first metal layer set on the substrate; wherein the first metal layer includes: touch control lines set in the display region, wherein each of the touch control line is electrically connected with corresponding touch control electrode, and adapted to provide a first signal for the corresponding touch control electrode; and a first BUS line set in the peripheral region, where the first BUS line is adapted to provide a second signal for at least one of the touch control lines, the gate lines, and the data lines.

It should be noted that, in the present disclosure, unless specified the use of the ordinal objectives "first", "second", "third", and "fourth", etc., merely indicates that different instances of like objects are being referred to, and is not intended to imply that the objects so described must be in a given sequence, in ranking or in any other manner.

Figure 3A:
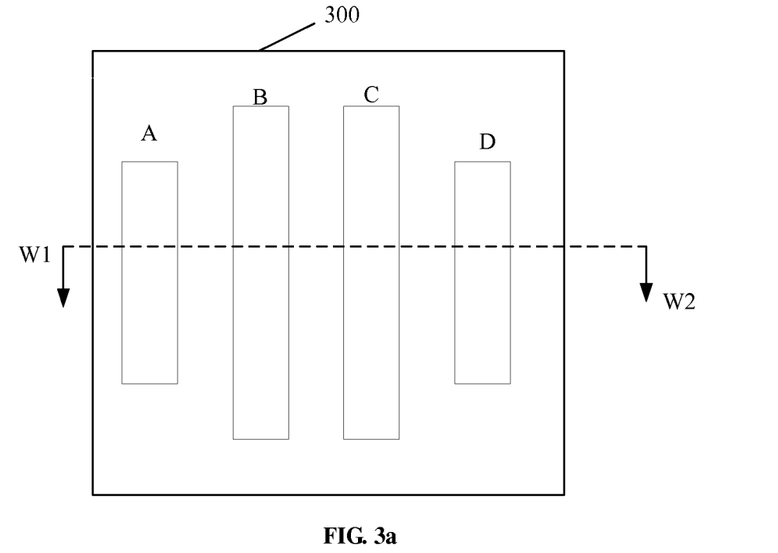
FIG. 3a schematically illustrates an top view of an existing BUS line arrangement.
Figure 3B:
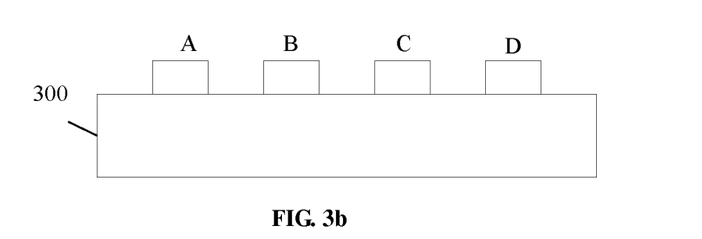

Referring to FIG. 3a, an existing arrangement of BUS lines is illustrated. The substrate 300 includes four BUS lines which are respectively BUS lines A, B, C and D. The BUS lines A, B, C and D are set on a common layer, as shown in FIG. 3b which is a sectional view along W1-W2 in FIG. 3a.

In the present disclosure, the BUS lines are set on different metal layers. In some embodiments, the BUS lines are respectively set on a first metal layer and a second metal layer. The first metal layer is the metal layer where the gate lines are located, and the second metal layer is the metal layer where the touch control lines located. Or, the first metal layer is the metal layer where the touch control lines are located, and the second metal layer is the metal layer where the gate lines are located.

Figure 3C:
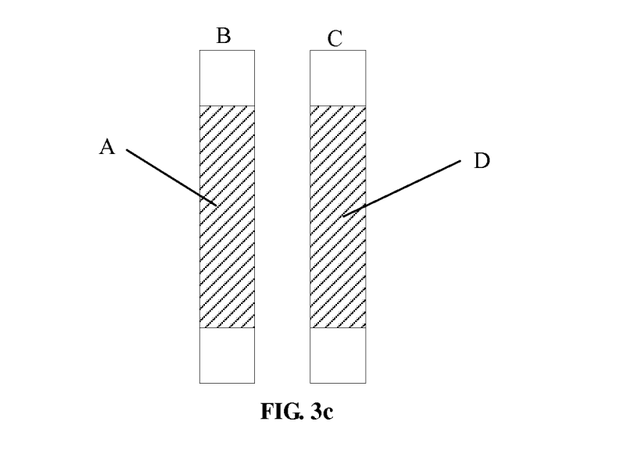
FIG. 3c schematically illustrates a sectional view of a BUS line arrangement according to one embodiment of the present disclosure.

Referring to FIG. 3c, a BUS line arrangement according to one embodiment of the present disclosure is illustrated. The BUS lines A, B, C and D are set on different layers, wherein the BUS lines B and C are set on one metal layer, while the BUS lines A and D are set on another metal layer. The BUS lines include a first BUS line and a second BUS line, wherein the BUS line, such as the BUS line A, and the BUS line D, which are located on one common layer is defined as a first BUS line, and the BUS lines, such as the BUS line B and the BUS line C, which are located on another common layer is defined as a second BUS line.

Accordingly, the substrate further includes a second metal layer, wherein the second metal layer includes the data lines set in the display region and the second BUS line set in the peripheral region. The second BUS line is used for providing a third signal to at least one selected from the touch control lines, the gate lines, and the data lines.

It can be understood that, projections of the first BUS line and the second BUS line on the substrate are partially or completely overlapped.

Figure 3D:
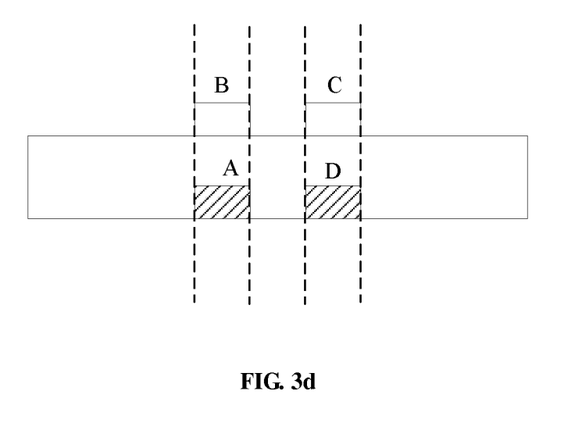
FIG. 3d schematically illustrates a sectional view a BUS line arrangement according to another embodiment of the present disclosure.

As shown in FIG. 3c, when the projections of the first BUS line and the second BUS line on the substrate are completely overlapped, area occupied by the four BUS lines is reduced and area of the peripheral region is saved. In this case, the area of the peripheral region is ideally half of the existing peripheral region. FIG. 3d is a sectional view of FIG. 3c. In comparison with FIG. 3c and FIG. 3b, it can be seen that, the BUS line arrangement provided by the present disclosure can reduce the area occupied by the BUS lines on one layer, thus narrow down the peripheral region.

When the projections of the first BUS line and the second BUS line on the substrate are partially overlapped, it can be understood that, the BUS lines can be configured into multiple arrangements. As referring to FIG. 3e, one way of arranging the BUS lines is illustrated.

Figure 3E:
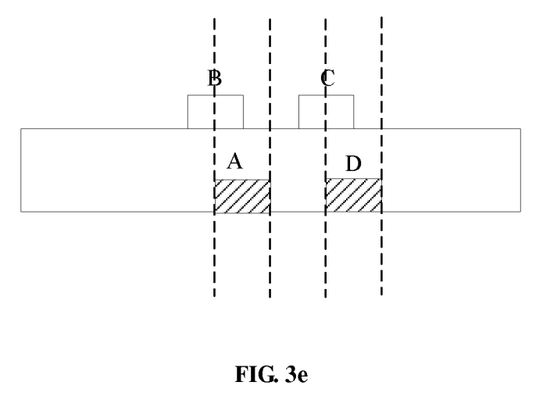
FIG. 3e schematically illustrates a sectional view a BUS line arrangement according to another embodiment of the present disclosure.

As shown in FIG. 3e, the BUS lines B and C are set on the second metal layer, and the BUS lines A and D are set on the first metal layer. Projections of the BUS lines A and B on the substrate are partially overlapped, and projections of the BUS lines C and D on the substrate are partially overlapped. The width of the overlapped part can be a half, a third or a quarter that of one BUS line. In other words, one BUS line may only have a half, a third or a quarter that of its width that overlapped with another BUS line. It should be noted that, the width of the overlapped part is not limited to a half, a third or a quarter that of one BUS line as recited above.

In the BUS line arrangement as shown in FIG. 3e, even though the BUS lines on the first metal layer are respectively overlapped with the BUS lines on the second metal, a distance between BUS lines on the first metal layer can be determined according to practical requirements. Similarly, a distance between BUS lines on the second metal layer also can be determined according to practical requirements. In some embodiments, the distance between BUS lines on the first metal layer and that on the second metal layer are equal, which may make the manufacturing process easier.

Figure 3F:
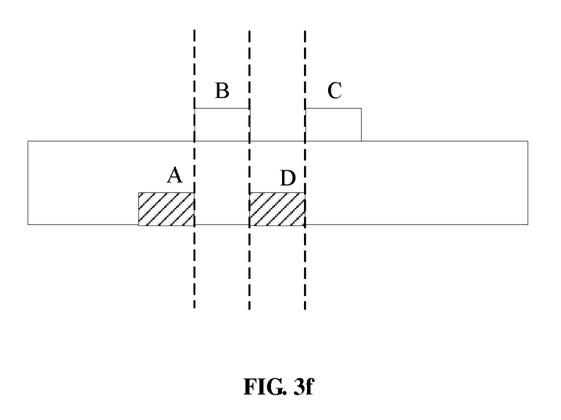
FIG. 3f schematically illustrates a sectional view a BUS line arrangement according to another embodiment of the present disclosure.

It should be noted that, even in the above embodiments, the BUS lines on the first metal layer and the BUS lines on the second metal layer are configured to be partially or completely overlapped, they may also not overlap when the distance between BUS lines on a common layer is appropriate. For example, if the distance between the BUS line B and the BUS line C, and the distance between the BUS line A and the BUS line D is larger than or equal to the width of one BUS line, the BUS lines on the first metal layer and the BUS lines on the second metal layer can be configured to be not overlapped. As shown in FIG. 3f, the distance between the BUS lines is equal to the width of one BUS line, and the BUS line A and the BUS line D are configured not overlapped with the BUS line B and the BUS line C.

Figure 3G:
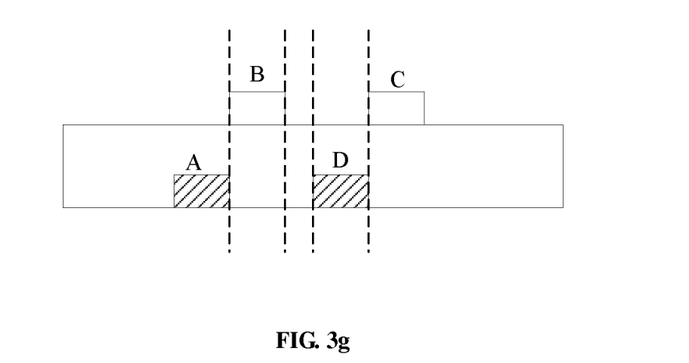
FIG. 3g schematically illustrates a sectional view a BUS line arrangement according to another embodiment of the present disclosure.

In another embodiment, when the distance between the BUS lines is larger than the width of one BUS line, as shown in FIG. 3g, the BUS line A and the BUS line D are configured not overlapped with the BUS line B and the BUS line C.

It should be noted that, the first metal layer is not only used for forming the first BUS line, but also for forming touch control lines in the display region.

Figure 4:
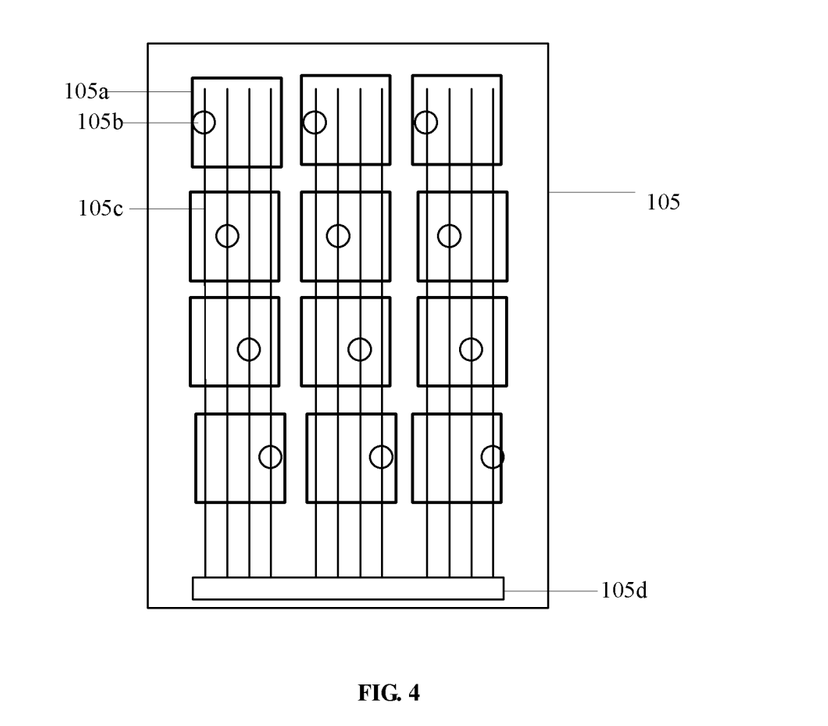
FIG. 4 schematically illustrates a top view of an array substrate according to one embodiment of the present disclosure.

Referring to FIG. 4, an array substrate is illustrated according to one embodiment of the present disclosure. The array substrate 105 includes: a plurality of touch control electrode 105a arranged in an array; and a plurality of touch control lines 105c each of which is electrically connected with one of the plurality of touch control electrodes 105a, that is a corresponding control electrode.

It can be understood that, any two of the touch control electrodes 105a neighboring to each other are electrically isolated.

During a displaying time period of a time sequence, the touch control electrodes 105a are imposed with a common voltage; and during a touch detecting time period of the time sequence, the touch control electrodes 105a are imposed with a signal for detecting touching.

It should be noted that, the signal for detecting touching is output by a drive chip 105d. The drive chip 105d can be a touch control chip, or an integral chip of touch control and display.

As shown in FIG. 4, when the touch control electrodes 105a and the touch control lines 105c are respectively configured on different layers, first via holes 105b are required for electrically connecting the touch control electrodes 105a and the corresponding touch control lines 105c, respectively.

It should be noted that, the touch control electrodes 105a and the common electrodes can be configured independently, or the touch control electrodes 105a and the common electrodes use a common set of electrodes.

It can be understood that, in FIG. 4, the touch control lines 105c and the first BUS line in the peripheral region are located on a common metal layer, that is, the first metal layer.

In this embodiment, the second BUS line is formed by the second metal layer. The second metal layer not only forms the second BUS line in the peripheral region, but also forms data lines (not shown in FIG. 4) in the display region.

Figure 5:
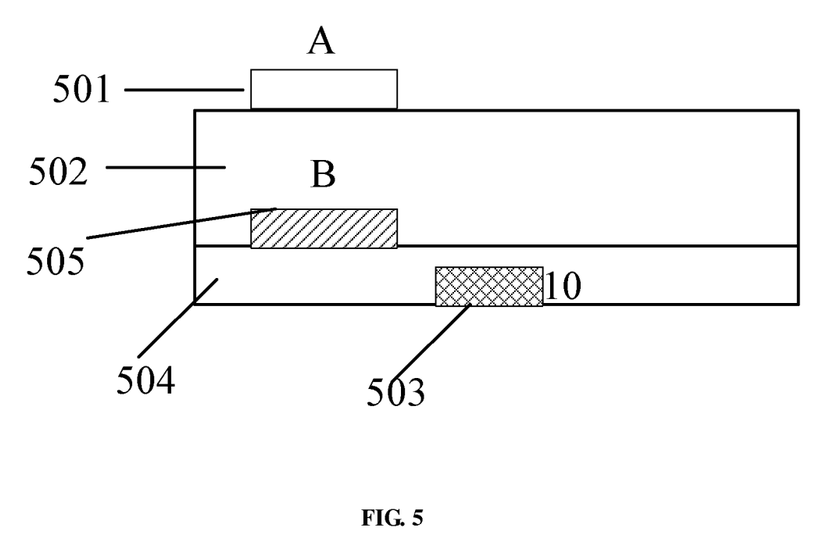
FIG. 5 schematically illustrates a sectional view of an array substrate according to one embodiment of the present disclosure.

Referring to FIG. 5, a sectional view of an array substrate according to one embodiment is illustrated. Connect lines are required for electrically connecting the first BUS line and the second BUS line in the peripheral region with devices being driven. When the first BUS line and the second BUS line are respectively formed by the first metal layer and the second metal layer, the connect lines are formed by a third metal layer. The third metal layer also forms gate lines in the display region.

As shown in FIG. 5, the BUS line A is set on the first metal layer 501, the BUS line B is set on the second metal layer 505, and the connect line 10 is set on the third metal layer 503.

A first insulating layer 502 is set between the first metal layer 501 and the second metal layer 505, and a second insulating layer 504 is set between the second metal layer 505 and the third metal layer 503.

It can be seen from FIG. 5, projections of the BUS line A and the BUS line B on the substrate are overlapped. Furthermore, the first insulating layer 502 may be an organic membrane. The second insulating layer 504 may be SiNx (Silicon Nitride).

In the array substrate provided by the above recited embodiments, the BUS lines in the peripheral region are formed by the first metal layer and the second metal layer. In some other embodiments, the BUS lines in the peripheral region are formed by the first metal layer and the third metal layer. In other words, the present disclosure further provides an array substrate including a third metal layer, wherein the third metal layer includes: gate lines set in the display region; and a third BUS line set in the peripheral region, the third BUS line is adapted to provide a fourth signal for at least one selected from the touch control lines, the gate lines and the data lines.

Figure 6:
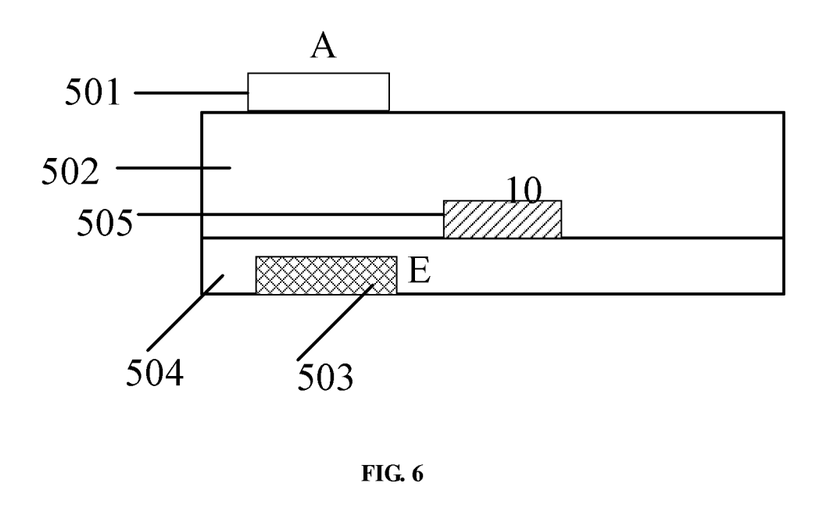
FIG. 6 schematically illustrates a sectional view of an array substrate according to another embodiment of the present disclosure.

Referring to FIG. 6, a sectional view of an array substrate according to one embodiment of the present disclosure is illustrated.

It can be understood that, connect lines are required for electrically connecting the first BUS line and the third BUS line in the peripheral region with devices being driven. When the first BUS line and the third BUS line are respectively formed by the first metal layer and the third metal layer, the connect lines are formed by a second metal layer. The second metal also forms gate lines in the display region.

As shown in FIG. 6, the first BUS line A is set on the first metal layer 501, the third BUS line E is set on the third metal layer 503, and the connect line 10 is set on the second metal layer 505.

A first insulating layer 502 is set between the first metal layer 501 and the second metal layer 505, and a second insulating layer 504 is set between the second metal layer 505 and the third metal layer 503.

In some embodiments, the first insulating layer 502 is an organic membrane. The second insulating layer 504 is SiNx.

It can be seen from FIG. 6, projections of the first BUS line A and the third BUS line E on the substrate are overlapped.

It should be noted that, whether the BUS lines are formed by the first metal layer and the second metal layer, or formed by the first metal layer and the third metal layer, the BUS lines on different layers can be configured according to the arrangements as illustrated in FIGS. 3c to 3g.

Connecting relations between the first BUS line and the connect lines, and between the second BUS line and the connect lines are as following.

Figure 7A:
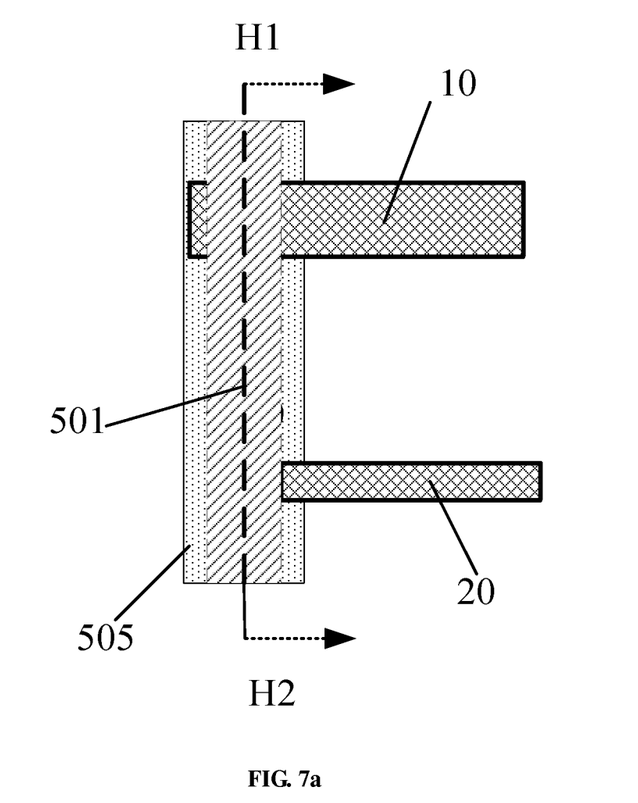
FIG. 7a schematically illustrates a top view of a BUS line according to one embodiment of the present disclosure.
Figure 7B:
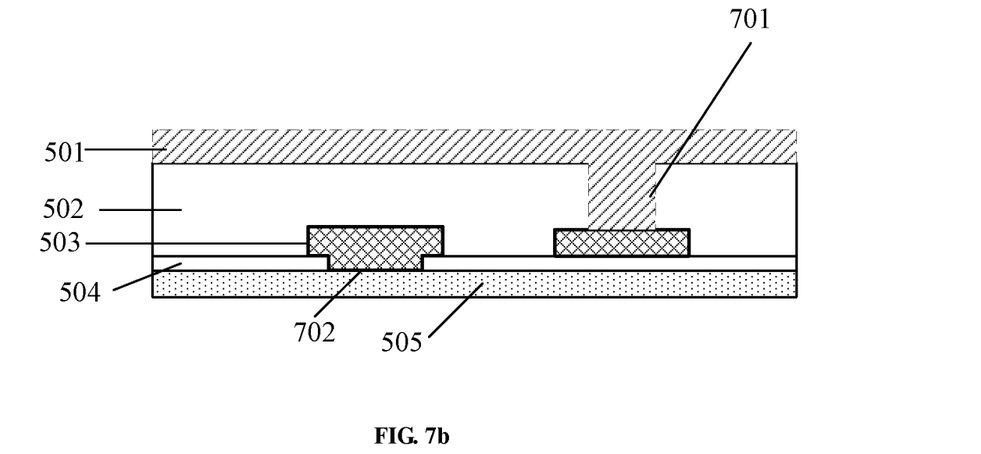

Referring to FIG. 7a and FIG. 7b, an arrangement of BUS lines according to one embodiment of the present disclosure is illustrated, wherein the first BUS line and the second BUS line are respectively formed by the first metal layer and the second metal layer. Referring to FIG. 7a, a top view of the BUS lines is illustrated. Referring to FIG. 7b, a sectional view of the BUS lines along H1-H2 in FIG. 7a is illustrated.

As shown, a first BUS line is set on the first metal layer 501, and a second BUS line is set on the third metal layer 503. The first insulating layer 502 is set between the first metal layer 501 and the second metal layer 505, and the second insulating layer 504 is set between the second metal layer 505 and the third metal layer 503.

In this embodiment, the array substrate further includes: a first connect line 10, a second connect line 20, and a gate drive unit (not shown in FIG. 7a and FIG. 7b). The first BUS line is electrically connected with the gate drive unit through the first connect line 10 which is formed by the second metal layer 505, and the first BUS line is electrically connected with the first connect line 10 through a first via hole 701.

The second BUS line is electrically connected with the gate drive unit through the second connect line 20 which is formed by the second metal layer 505, and the second BUS line is electrically connected with the second connect line 20 through a second via hole 702.

Similarly, when the first BUS line and the third BUS line are respectively formed by the first metal layer and the second metal layer, connecting relations between the first BUS line and the connect lines, and between the third BUS line and the connect lines are as following.

In this embodiment, the array substrate further includes: a third connect line, a fourth connect line, and a gate drive unit. The first BUS line is electrically connected with the gate drive unit through the third connect line which is formed by the third metal layer, and the first BUS line is electrically connected with the third connect line through a third via hole.

The third BUS line is electrically connected with the gate drive unit through the fourth connect line which is formed by the third metal layer, and the third BUS line is electrically connected with the fourth connect line through a fourth via hole.

In the above recited embodiments, one BUS line is only set on one metal layer. However, in some embodiments, one BUS line may be set on two metal layers. In other words, the BUS line has a first portion and a second portion, wherein the first portion of the BUS line is set on one metal layer, while the second portion of the BUS line is set on another metal layer, and the first portion and the second portion are electrically connected through a via hole. It can be understood that, when one BUS line is set on two metal layers, a thickness of the BUS line is enlarged, thus a resistance of the BUS line is reduced.

Figure 8:
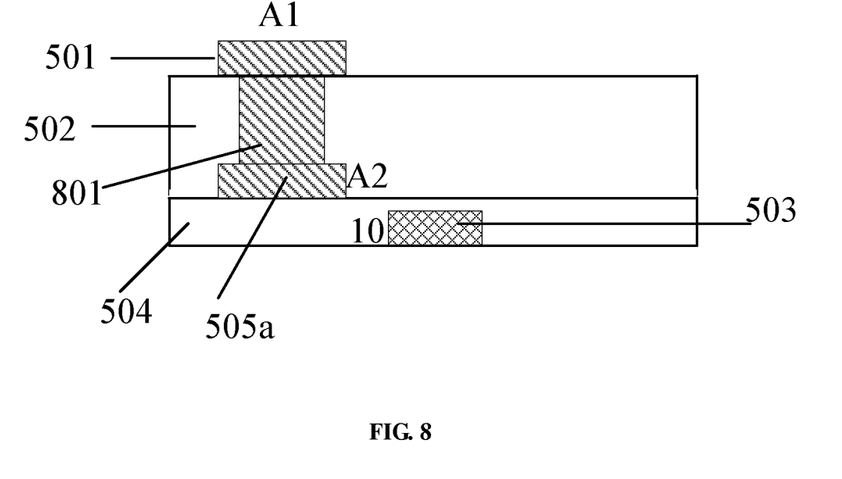
FIG. 8 schematically illustrates a sectional view of a first BUS line according to one embodiment of the present disclosure.

Referring to FIG. 8, a sectional view of a BUS line according to one embodiment of the present disclosure is illustrated.

In this embodiment, the array substrate further includes a fourth metal layer 505a. The fourth metal layer 505a includes data lines set in the display region. The first BUS line includes a first portion A1 and a second portion A2, the first portion A1 is formed by the first metal layer 501, and the second portion A2 is formed by the fourth metal layer 505a.

It some embodiments, the first portion A1 and the second portion A2 can be electrically connected with each other through a via hole 801. The via hole 801 forms a groove along a direction along which the first portion A1 and the second portion A2 extending.

Figure 9:
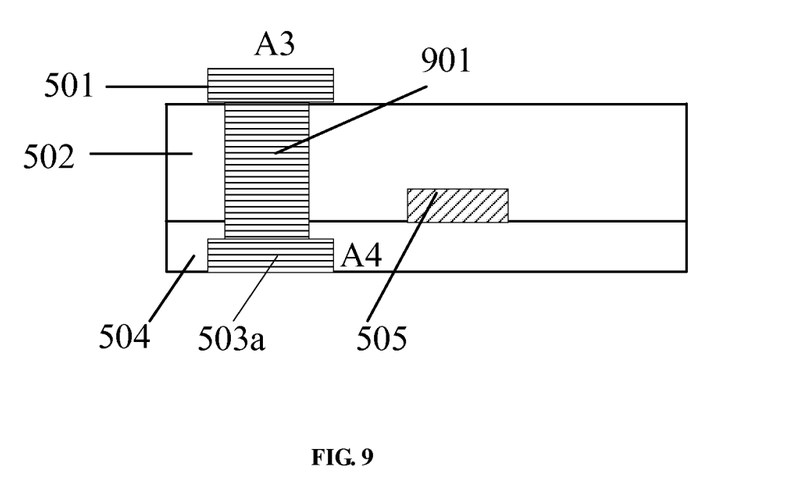
FIG. 9 schematically illustrates a sectional view of a first BUS line according to another embodiment of the present disclosure.

Similarly, the first portion and the second portion of the BUS line also can be formed by the first metal layer 501 and a fifth metal layer 503a, as shown in FIG. 9.

In this embodiment, the array substrate further includes a fifth metal layer 503a. The fifth metal layer 503a includes gate lines in the display region. The first BUS line includes a third portion A3 and a fourth portion A4, the third portion A3 is formed by the first metal layer 501, and the fourth portion A4 is formed by the fifth metal layer 503a.

Figure 10:
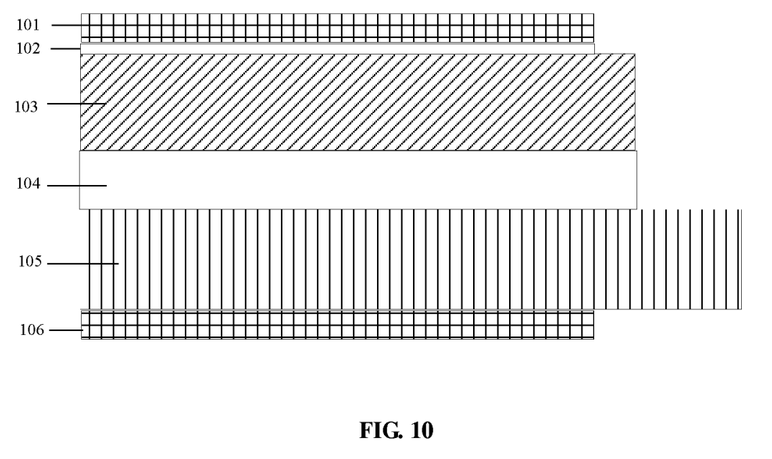
FIG. 10 schematically illustrates a display panel according to one embodiment of the present disclosure.

Referring to FIG. 10, a display panel according to one embodiment of the present disclosure is illustrated. The display panel includes any one of the array assemblies 105 recited above, and a color film substrate 103, wherein the array substrate 105 and the color film substrate 103 are set face to face.

Taking the LCD (Liquid Crystal Display) as an example, the display panel further includes a liquid crystal layer 104 which is set between the color film substrate 103 and the array substrate 105.

Regarding self capacitive liquid crystal touch screen, the display panel further includes a high-impedance shield layer 102 set on the color film substrate 103. The high-impedance barrier layer 102 is adapted to block a static signal having a frequency smaller than a first preset frequency, so as to prevent this static signal from interfering the display panel. The high-impedance barrier layer 102 is also adapted to transmit a touch control signal which has a frequency larger than the first preset frequency.

It can be understood that, static signals are generally low frequency signals, and touch control signals are generally high frequency signals, thus the high-impedance barrier layer 102 is adapted to block signals in low frequency and transmit signals in high frequency. Therefore, the high-impedance barrier layer 102 will not affect the touch control detection.

Figure 11:
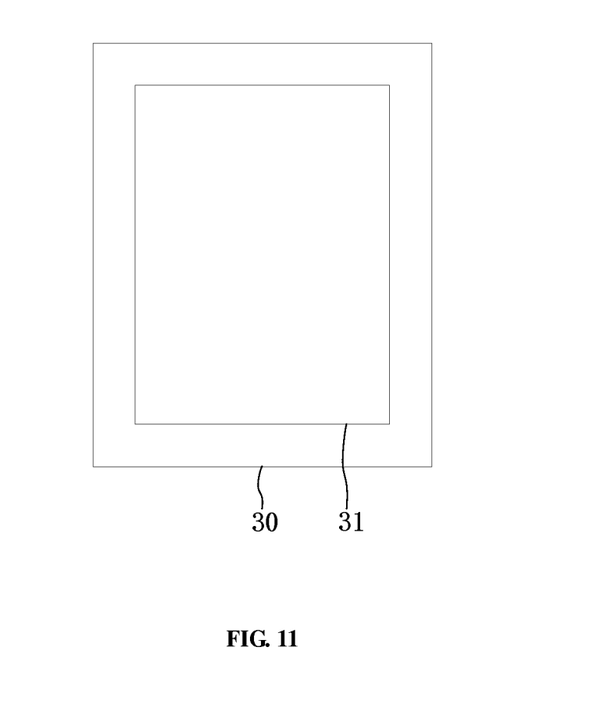
FIG. 11 schematically illustrates an electronic device according to one embodiment of the present disclosure.

Referring to FIG. 11, an electronic device according to one embodiment of the present disclosure is illustrated.

As shown, the electronic device 30 includes a display panel 31. The display panel 31 is any one of the display panels as recited above. The electronic device 30 may further include a drive circuit, and any other components for supporting normal working of the electronic device 30.

The electronic device 30 may be a mobile phone, a desktop computer, a laptop, a tablet computer, or a piece of electronic paper.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An array substrate, comprising:
   a substrate, defining a display region and a peripheral region;
   a first metal layer on a first insulating layer, a second metal layer on a second insulating layer, and a third metal layer, wherein the first insulating layer is disposed on the second metal layer, the second insulating layer is disposed on the third metal layer, and the first, second and third metal layers are disposed on both the display region and the peripheral regions on the substrate;
   a plurality of gate lines formed in the third metal layer in the display region;
   a plurality of data lines formed in the second metal layer in the display region;
   a plurality of touch control lines formed in the first metal layer in the display region;
   a plurality of touch control electrodes disposed in the display region and electrically isolated from each other;
   a plurality of first connect lines and a plurality of second connect lines formed in the second metal layer extending in a first direction from the peripheral region toward the display region;
   wherein the plurality of touch control lines each are electrically connected to one of the plurality of touch control electrodes and provide a first signal to the one of the plurality of touch control electrodes;
   a first BUS line formed in the first metal layer in the peripheral region, adapted to provide a second signal for the plurality of touch control lines;
   a second BUS line formed in the third metal layer in the peripheral region, adapted to provide a fourth signal for the plurality of gate lines;
   wherein the first BUS line and the second BUS line at least partially overlap, and extend in a second direction perpendicular to the first direction;
   wherein the first BUS line in the first metal layer is connected with the plurality of first connect lines in the second metal layer through a first via hole in the first insulating layer, and wherein the first BUS line is electrically connected with a device driven by the second signal via one of the plurality of first connect lines;
   wherein the second BUS line in the third metal layer is connected with the plurality of second connect lines in the second metal layer through a second via hole in the second insulating layer, and wherein the second BUS line is electrically connected with a gate drive unit via one of the plurality of second connect lines; and
   wherein the first via hole does not penetrate the second insulating layer and the second via hole does not penetrate the first insulating layer, such that the first BUS line and the second BUS line are electrically isolated from each other.

2. A display panel, comprising the array substrate according to claim 1.

3. An electronic device, comprising the display panel according to claim 2.

4. The array substrate according to claim 1, wherein the first insulating layer is an organic membrane and the second insulating layer is SiNx (Silicon Nitride).

5. An array substrate, comprising:
a substrate, defining a display region and a peripheral region;
a first metal layer on a first insulating layer, a second metal layer on a second insulating layer, and a third metal layer, wherein the first insulating layer is disposed on the second metal layer, the second insulating layer is disposed on the third metal layer, and the first, second and third metal layers are disposed on both the display region and the peripheral regions on the substrate;
a plurality of gate lines formed in the third metal layer in the display region-;
a plurality of data lines formed in the second metal layer in the display region;
a plurality of touch control lines formed in the first metal layer in the display region;
a plurality of touch control electrodes disposed in the display region and electrically isolated from each other;
a plurality of third connect lines and a plurality of fourth connect lines formed in the third metal layer extending in a first direction from the peripheral region toward the display region;
wherein the plurality of touch control lines each are electrically connected to one of the plurality of touch control electrodes and provide a first signal to the one of the plurality of touch control electrodes;
a first BUS line formed in the first metal layer in the peripheral region, adapted to provide a second signal for the plurality of touch control lines; and
a third BUS line formed in the second metal layer in the peripheral region, adapted to provide a third signal for the plurality of data lines;
wherein the first BUS line and the third BUS line at least partially overlap, and extend in a second direction perpendicular to the first direction;
wherein the first BUS line in the first metal layer is connected with the plurality of third connect lines in the third metal layer through a third via hole, and the third BUS line is electrically connected with a device driven by the second signal via one of the plurality of third connect lines;
wherein the third BUS line in the second metal layer is connected with the plurality of fourth connect lines in the third metal layer through a fourth via hole in the second insulating layer, and the third BUS line is electrically connected with a device driven by the third signal via one of the plurality of fourth connect lines; and
wherein the fourth via hole does not penetrate the first insulating layer, and the first BUS line and the third BUS line are electrically isolated from each other.

6. The array substrate according to claim 5, wherein the first insulating layer is an organic membrane and the second insulating layer is SiNx (Silicon Nitride).

7. A display panel, comprising the array substrate according to claim 5.

8. An electronic device, comprising the display panel according to claim 7.

* * * * *